United States Patent [19]

Richter

[11] 4,117,360
[45] Sep. 26, 1978

[54] SELF-SUPPORTING AMORTISSEUR CAGE FOR HIGH-SPEED SYNCHRONOUS MACHINE SOLID ROTOR

[75] Inventor: Eike Richter, Scotia, N.Y.

[73] Assignee: General Electric Company, Schenectady, N.Y.

[21] Appl. No.: 787,857

[22] Filed: Apr. 15, 1977

[51] Int. Cl.² .................. H02K 21/12; H02K 3/20
[52] U.S. Cl. .................. 310/183; 310/156; 310/262
[58] Field of Search ............ 310/182, 183, 156, 162, 310/192, 197, 210, 261, 262, 265, 271

[56] References Cited

U.S. PATENT DOCUMENTS

| 459,923 | 9/1891 | Beattie, Jr. | 310/271 |
|---|---|---|---|
| 1,637,182 | 7/1927 | Glaubitz | 310/183 |
| 2,539,747 | 1/1951 | Moore | 310/262 |
| 2,683,230 | 7/1954 | Mickelson | 310/183 X |
| 2,719,931 | 10/1955 | Kober | 310/183 UX |
| 2,930,916 | 3/1960 | Scanlon et al. | 310/183 X |
| 2,985,779 | 5/1961 | Flaningam et al. | 310/183 X |
| 3,792,297 | 2/1974 | Torok | 310/183 |

*Primary Examiner*—Mark O. Budd
*Attorney, Agent, or Firm*—Nathan D. Herkamp; Joseph T. Cohen; Leo I. MaLossi

[57] ABSTRACT

A self-supporting amortisseur winding in the form of a thin copper cage is situated about the solid rotor of a high-speed, permanent magnet synchronous machine in order to keep commutating reactance low. A high-strength wire is wound, with high tension, circumferentially about the cage to counteract the effects of centrifugal force on the cage when the machine is operating.

12 Claims, 2 Drawing Figures

SELF-SUPPORTING AMORTISSEUR CAGE FOR HIGH-SPEED SYNCHRONOUS MACHINE SOLID ROTOR

INTRODUCTION

This invention relates to high-speed solid rotors for synchronous machines, and more particularly to an amortisseur cage and support means thereof for such rotors.

High-speed permanent magnet generators, as have been recently developed, required an ultrastrong retaining structure on the rotor to hold the magnets in place against centrifugal force, since rotor tip speeds may normally be as high as 650 feet per second. The magnet retaining structure is typically a shrink ring in which the stress level is in the range of $120 \times 10^3$ to $150 \times 10^3$ pounds per square inch. Usually a permanent magnet machine also requires a power conditioner for proper operation when connected in a constant voltage electrical system, since the back EMF in such machine cannot be regulated. The power conditioner comprises electronic apparatus for making two or more power sources compatible with each other in voltage, frequency, or both.

When designing a permanent magnet machine with a solid-state power conditioner, one of the key machine parameters is the so-called commutating reactance $X_c$, which is the equivalent reactance of the machine connected to the power conditioner when the power conditioner is commutating, or transferring direct current from one conduction path to another. The commutating reactance is substantially identical to the negative sequence reactance of these machines. In conventional machines, the amortisseur or damper windings about the rotor help keep $X_c$ down to a low value. In solid rotor type machines, such windings can perform the same function they perform in conventional machines; however, in high-speed permanent magnet machines, there is apparently no way to imbed amortisseur windings in the magnet retaining structure (i.e., the shrink ring). Any holes or slots in the shrink ring would result in stress concentration at those locations which likely would exceed the material limits. Therefore, in order to achieve a low value of $X_c$ for solid rotor machines, the level of synchronous reactance, or apparent generator reactance that determines output current under steady-state short-circuit conditions, must be lowered significantly in comparison to wound rotor machines. This results in a machine which is larger and heavier than an equivalent horsepower wound rotor machine. Therefore, introduction of an amortisseur winding into a solid rotor machine, without interfering with the mechanics of the rotor, would permit significant reduction in physical size of the machine because the effect of the synchronous reactance upon the commutating reactance would be compensated by the low reactance of the amortisseur winding so as to avoid any significant decrease in power factor.

The present invention is concerned with a type of amortisseur cage and support means therefor, especially suited for high-speed solid rotor type synchronous machines. The amortisseur circuit improves the subtransient performance of a solid rotor type machine, which is especially advantageous when such machine operates in conjunction with a nonlinear power conditioner, typically solid state. Moreover, the amortisseur cage also allows such machine to operate at increased power density as compared to solid rotor machines without amortisseur windings. The amortisseur cage of the invention is primarily intended for a high-speed permanent magnet machine where imbedding of amortisseur bars in the rotor surface is essentially impossible because of high stress concentrations which thereby occur during normal operation of the machine. However, it may also be used advantageously for inductor alternators and claw pole type machines where placement of the amortisseur bars in the rotor surface does not create excessive stresses but is nevertheless impractical because of the high manufacturing costs which this process incurs.

Accordingly, one object of the invention is to achieve a significant reduction in physical size of solid rotor machines for any given horsepower rating.

Another object is to provide an amortisseur winding for a high-speed solid rotor machine.

Another object is to provide a self-supporting amortisseur winding which externally encircles the solid rotor of a synchronous machine.

Briefly, in accordance with a preferred embodiment of the invention, an amortisseur winding for a high-speed solid rotor machine comprises a cylindrical cage fabricated of electrically conductive sheet. The cage includes circular end portions adapted to fit tightly about the circumferential ends of the machine rotor. The end portions of the cage are joined by a plurality of ribs disposed about the circumference of the rotor. Constricting means exhibiting high tensile strength are wound circumferentially under tension about the cage so as to retain the cage in contact with the rotor against centrifugal force when the machine is operating.

DESCRIPTION OF TYPICAL EMBODIMENTS

Figure 1:
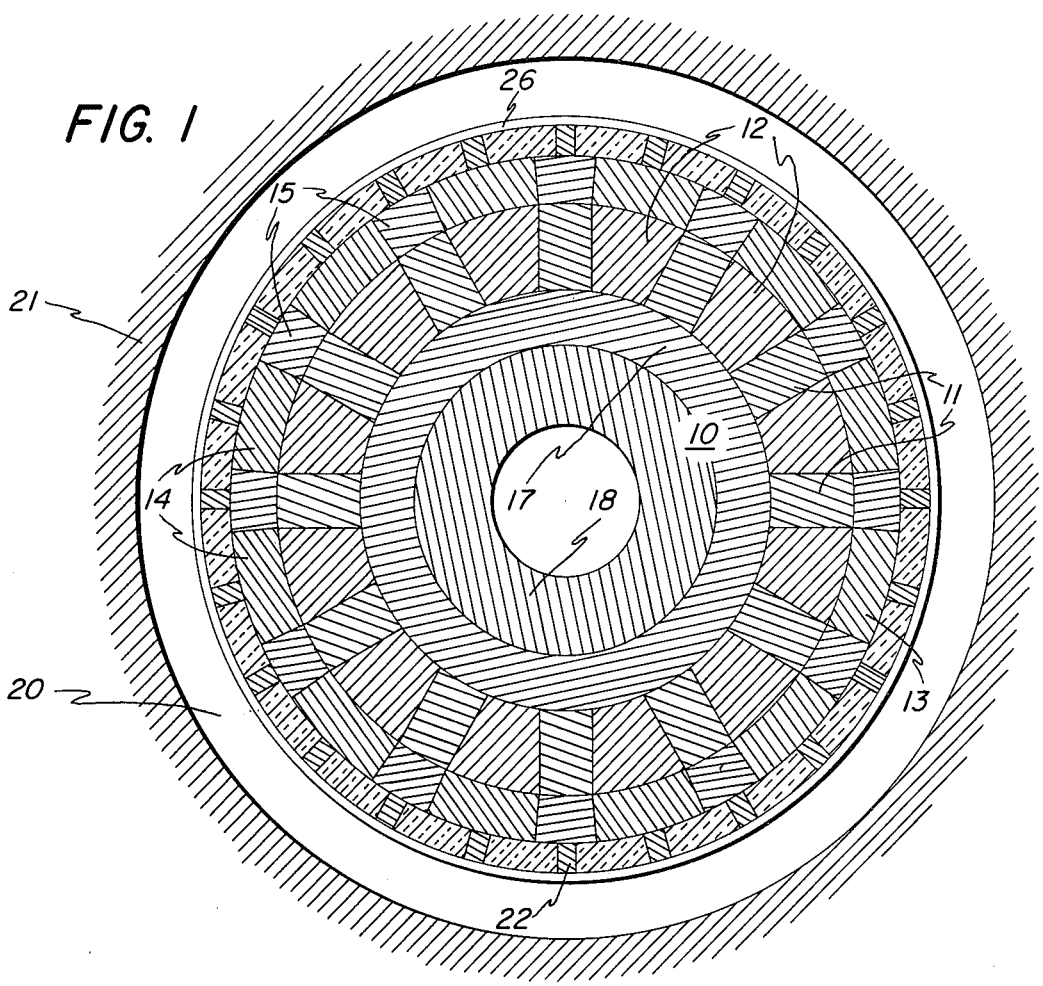
FIG. 1 is a sectional view of a typical permanent magnet rotor for a high-speed synchronous machine, employing the instant invention.

In FIG. 1, a rotor 10 for a high-speed permanent magnet alternator is illustrated as comprising magnets 11, inserted between pole pieces 12 and contained externally by a bimetallic shrink ring 13 and internally by a nonmagnetic hub 17. Pole pieces 12 are welded to hub 17. By employing rare earth cobalt magnets 11, the power density and power-to-weight ratio of the machine are made comparable to those of a wound rotor machine. Hub 17 is fitted about, and affixed to, machine shaft 18 by conventional means (not shown), such as keying, for example.

In operation at normal high speed, a nonmagnetic shrink ring 13, if made entirely of highly resistive material, would require a radial thickness great enough to interfere drastically with the magnetic circuit; i.e., air gap flux density in the space 20 between stator 21 and rotor 10 would be significantly reduced. To overcome this problem, shrink ring 13 is fabricated of alternate magnetic sections 14 and nonmagnetic sections 15 of high tensile strength material exhibiting high electrical resistivity, welded together. The shrink ring holds the rotor assembly in a state of compression over the total operating speed range. To minimize rotor leakage flux, both hub 17 and shaft 18 are fabricated of nonmagnetic material such as Inconel nickel-chromium alloy available from Huntington Alloys, Inc., Huntington, W. Va., or a stainless steel of the 300 series. For proper operation of the unit, the bimetallic shrink ring is fabricated with magnetic sections 14 in radial alignment with magnetic pole pieces 12 and nonmagnetic sections 15 aligned with magnets 11 in the interpolar spaces. Nonmagnetic sections 15 may typically comprise MP35N high strength alloy available from Latrobe Steel Company, Latrobe, Pa., while magnetic sections 14 may typically comprise 300 maraging steel.

Figure 2:
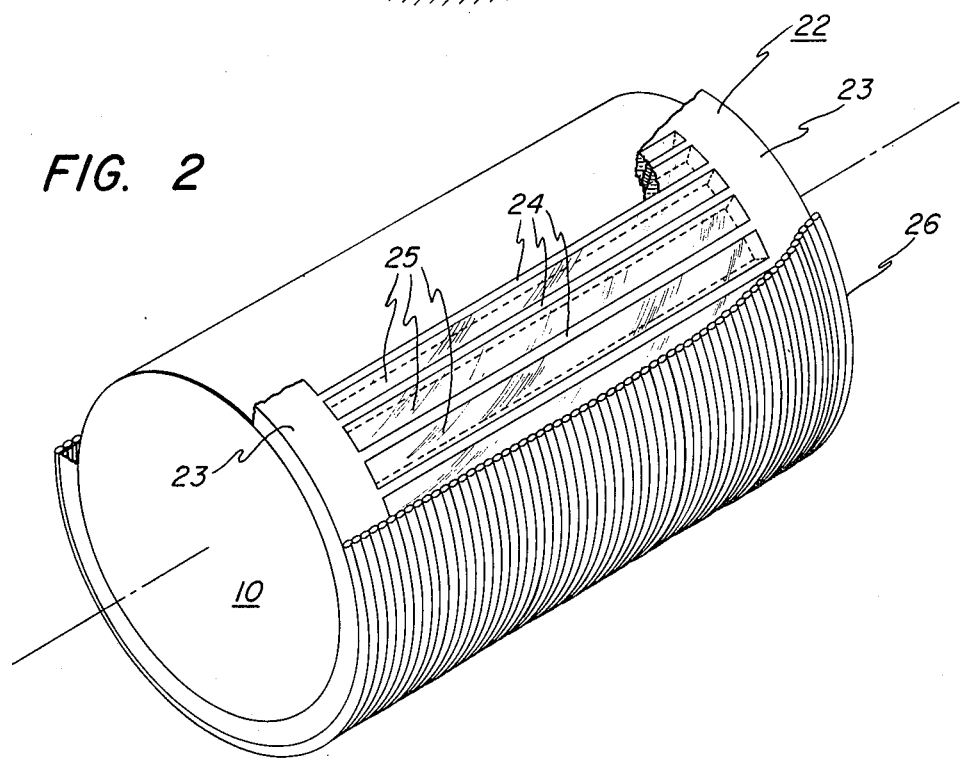
FIG. 2 is a partially cut-away perspective view of the amortisseur winding of the invention as it is situated upon the rotor of FIG. 1.

A thin copper cage 22 is brazed into a ring formed tightly about the right circular cylindrical surface of rotor 10. Cage 22, as best illustrated in FIG. 2, comprises a pair of circular sections 23 formed of copper sheet and located at either axial end of rotor 10. Rings 23 are connected by longitudinally-directed ribs 24 of copper sheet integrally joined to the rings. Situated in the space between each pair of successive ribs 24 is a glass laminate 25 which provides a smooth, nonconductive surface flush with the surface of cage 22. The entire circumferential surface is thereupon wrapped circumferentially by bandaging wire 26. Wire 26, which is wound under high tension, comprises a high tensile strength material, preferably nonmagnetic (although a thin magnetic wire would not signficantly reduce the desirable rotor flux). Eddy current losses in wire 26, which may typically be comprised of piano wire, are reduced to negligible magnitude by insuring that the wire is coated with an insulating oxide layer over its entire length so as to preclude turn-to-turn conduction through adjacent contacting surfaces.

Those skilled in the art will appreciate that a solid copper sheet, rather than a cage, could serve the same purpose of reducing the subtransient reactance, or apparent reactance of the stator winding at the instant a short circuit occurs. However, under such circumstances, all air gap harmonic waves would be dampened in the amortisseur winding (i.e., the copper sheet), resulting in extremely high losses. Since the primary purpose of the amortisseur winding is to respond to low order harmonics, little more than a relatively crude grid of bars is required in order to reduce the losses significantly.

Those skilled in the art will also appreciate that increasing the synchronous reactance has the same effect as increasing the armature reaction (for a constant number of poles). Normally, however, the magnets on the rotor can accommodate this increase in counter magneto-motive force only by manifesting a decrease in flux level. Therefore, machine volume decrease due to a higher synchronous reactance level is counterbalanced by the decrease in magnetic flux density unless larger magnets are employed in the rotor.

Thus introduction of an amortisseur cage about a permanent magnet rotor results in a significant reduction in the subtransient reactance and negative reactance levels. Consequently, the synchronous reactance level can be raised without detrimental effect on performance of the machine, while a significantly lower specific weight of the machine is also achieved thereby.

The foregoing describes apparatus which permits achieving a significant reduction in physical size of solid rotor machines for any given horsepower rating. An amortisseur winding is provided for a high-speed solid rotor machine, the amortisseur winding being entirely self-supporting and externally encircling the solid rotor of a synchronous machine.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. In a high-speed solid rotor machine wherein the rotor comprises:
   a cylindrical nonmagnetic hub; a plurality of circumferentially-spaced longitudinally-extending pole pieces affixed to the outer surface of said hub; a plurality of permanent magnets disposed between said pole pieces; a shrink ring surrounding and retaining said pole pieces and permanent magnets; said shrink ring maintaining said hub, pole pieces and magnets in a state of compression over the total operating speed range of the machine, the improvement comprising:
   a cylindrical amortisseur cage fabricated of electrically conductive sheet, fitting tightly about and radially-outward of said shrink ring, said cage including circular end portions joined by a plurality of spaced ribs disposed about the circumference of said shrink ring; and
   means exhibiting high tensile strength wound circumferentially under tension about said cage for retaining said cage in contact with said shrink ring against centrifugal force when said machine is operating.

2. The improvement of claim 1 wherein the spaces between adjacent ribs of the amortisseur cage are filled with nonconductive material flush with the surface of said cage so as to produce a smooth, cylindrical surface about which said retaining means is wound.

3. The improvement of claim 1 wherein said conductive sheet is made of copper.

4. The improvement of claim 2 wherein said conductive sheet is made of copper.

5. The improvement of claim 1 wherein said retaining means comprises insulated wire.

6. The improvement of claim 2 wherein said retaining means comprises insulated wire exhibiting high tensile strength.

7. The improvement of claim 3 wherein said retaining means comprises insulated wire.

8. The improvement of claim 4 wherein said retaining means comprises insulated wire.

9. The improvement of claim 1 wherein said ribs extend longitudinally.

10. The improvement of claim 2 wherein said ribs and said spaces extend longitudinally.

11. The improvement of claim 9 wherein said retaining means comprises nonmagnetic wire.

12. The improvement of claim 10 wherein said retaining means comprises nonmagnetic wire.

* * * * *